United States Patent Office 3,309,801
Patented Mar. 21, 1967

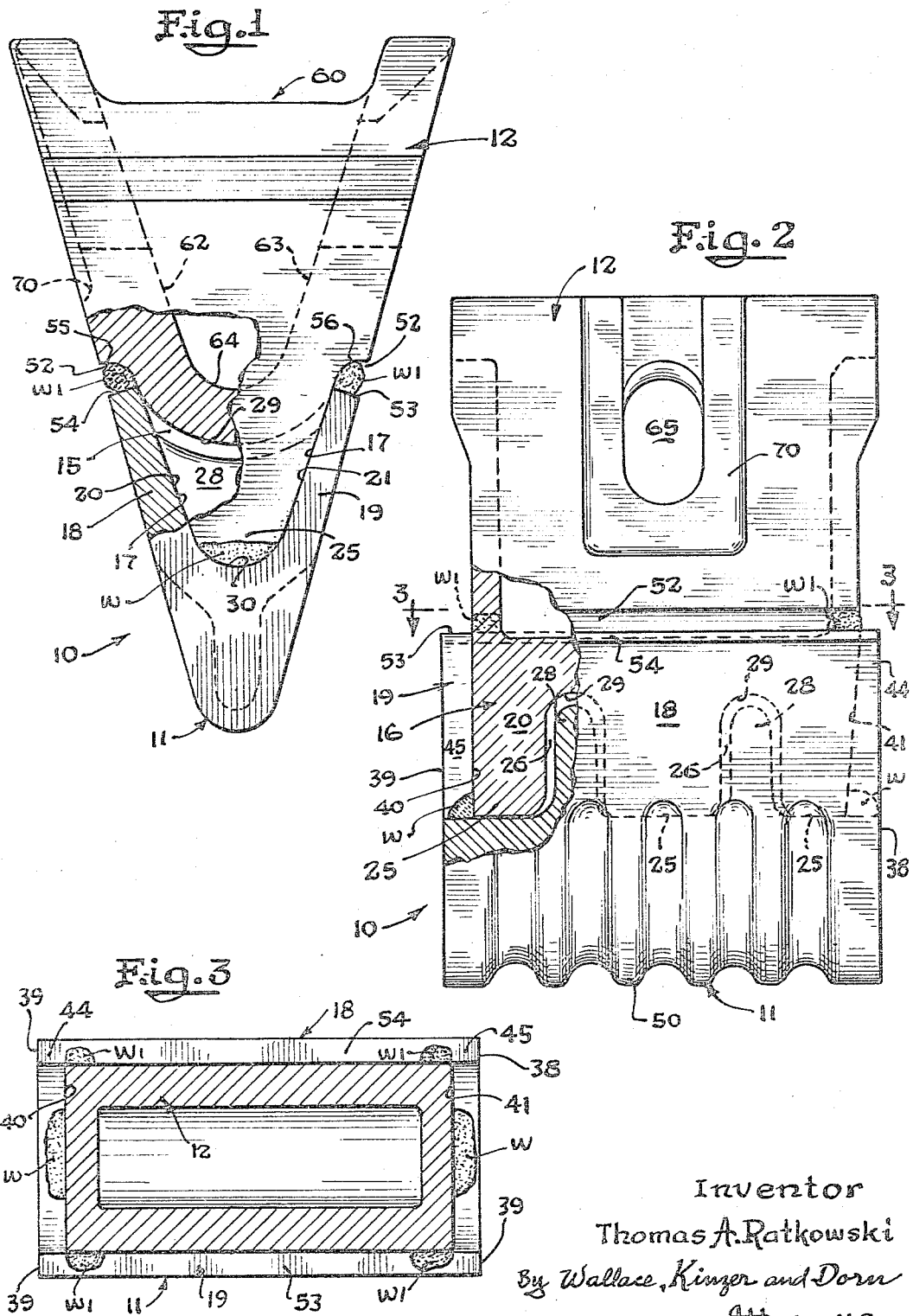

3,309,801
REPOINTER
Thomas A. Ratkowski, Chicago Heights, Ill., assignor to
Abex Corporation, a corporation of Delaware
Filed May 5, 1964, Ser. No. 364,963
2 Claims. (Cl. 37—142)

This invention relates to so-called cast-to-shape repointers for digger teeth of the kind associated with dippers, clamshell buckets, ore loaders, dragline buckets or the like, and also to the method of securing such repointers in place.

The present invention is particularly directed to the problem of repointing worn teeth on buckets, dippers or the like in an efficacious and novel manner. When the teeth of a power shovel or the like are worn sufficiently to be repointed, the teeth are sometimes rebuilt by a number of time-consuming and relatively expensive welding operations such as building up the entire worn-away with a welding rod, welding a flat bar across the worn remnant of the tooth and then building up a weld across and about the flat bar to build up the general shape of a new tooth point, or cutting away a portion of a worn tooth and in some areas building up the worn tooth to a wedge shape capable of receiving a complementally-shaped opening of a so-called cast-to-shape repointer. Ratkowski Patent No. 2,608,111 and Daniels Patent No. 2,369,285 disclose some of the known techniques. In any of the above methods, considerable welding is required, and the operation is a time consuming and relatively expensive operation.

Accordingly, an object of the present invention is to so construct a cast-to-shape repointer and a related holder or adapted as to avoid the normal building up or dressing down of the worn tooth as heretofore practiced.

While dippers or the like, to which the present invention is directed, sometimes have employed teeth secured to the base of the shovel or bucket, which are repointed as described above, the present invention also is directed to an improved replaceable tooth or point of the kind which may be secured removably to a second or primary adapter, which in turn is secured to the base of a dipper bucket or other support for the tooth assembly as a whole. Thus, when a so-called replaceable, two-part dipper tooth becomes worn, a key or like retainer is removed from the adapter, and the worn tooth is removed and replaced by a new tooth after which the key is again returned into position to hold the new tooth in its proper position on the adapter. The present invention readily lends itself to such practices, in which event the adapter herein described will be separated from the primary adapter which itself is secured by a retainer to the dipper lip or other support.

Another object of the invention is to facilitate the repair of teeth or the like for buckets or shovels by affording a novel tooth construction such as secured to an adapter by judiciously placed welds at spaced and stragtegic locations while reducing considerably the welding required by practices of replacing teeth for buckets or the like.

A further object of the invention is a novel cast-to-shape repointer having portions overhanging the adapter to provide protective pockets or areas for the reception of small, individual welds for securing the repointer to the adapter. As a further object of the invention, the repointer and adapter are specifically related to one another so that protected welds can be disposed both well forward at the forwardmost interface of the adapter and repointer, and well rearward, so as to maximize the spacing of the welds.

Other and further objects of the persent invention will be apparent from the following description and claims and are illustrated in the accompanying drawing which, by way of illustration, shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:
FIG. 1 is a side view with a partial section broken away to illustrate a cast-to-shape repointer secured to an adapter, according to one embodiment of the invention;
FIG. 2 is a plan view, partly in section, of a cast-to-shape repointer secured to an adapter; and
FIG. 3 is a sectional view taken along the lines 3—3 in FIG. 2 in the direction of the arrows.

Referring now to the drawings, and more particularly to FIG. 1, there is illustrated a repointed assembly 10, which includes a replaceable repointer or digging blade 11 detachably secured to an adapter or holder 12, which is rigidly secured to the foremost lip of a dipper, clamshell bucket, ore loader, drag-line bucket, or the like, as hereinafter explained, to constitute the leading edge or lip thereof. It should be noted, however, that while the present invention will be described herein from the standpoint of an associated repointer and adapter, the repointer and its manner of attachment can also be used with other kinds of holders and adapters.

The repointer 11 is in the form of a one-piece casting with an internal socket 15 shaped to neatly receive the foremost end 16 of the holder or adapter 12 to which the point 11 is to be detachably secured by welding. In the present instance, the socket 15 is generally V-shaped, boundaries thereof being defined by the respective, interior surfaces 17 on a spaced upper wall 18 and lower wall 19, FIG. 2. As best seen in FIG. 1, the adapter 12 has a V-shaped forward end 16 with opposed inclined surfaces 20 and 21 extending into tight abutting relationship with the interior surfaces 17 of their respective upper and lower walls 18 and 19 on the repointer 11. That is to say, the complementary angular disposition of the walls 18 and 19, and the surfaces 20 and 21 on the holder 12, are such as to be nested within each other when assembled together.

To prevent twisting and turning of the repointer 11 about a foremost portion or nose 25 of the holder 12, the end 16 of the holder 12 is provided with a pair of spaced grooves 26, for receiving therein a pair of spaced complementally-shaped and spaced tongues 28 on the repointer 11. The grooves 26, FIG. 2, extend from the foremost portion 25 towards the rear of the holder 12 to divide the foremost end 16 of the holder into three distinct portions. The rearwardly extending grooves 26 terminate in rounded surfaces 29 toward which the rearwardly extending tongues or fingers 28, FIG. 2, extend. However, the tongues 28 do not engage the rounded surfaces 29 when the point 16 is disposed in tight engagement with the V-shaped opening in the repointer tip 11. When the repointer 11 is forced on the adapter 12, the tongues 28 slide readily into matching grooves 26 because of substantial clearance between the tongues 28 and the sidewalls of the grooves 26.

The manner of attachment of the repointer 11 to the adapter 12 is an important aspect of the present invention, as is the unique shape and geometry of the repointer 11, which facilitates the employment of small and spaced welds at strategic locations and which provides substantial protection to these welds while rendering the welds readily accessible for burning out, when it is desirable to detach a worn repointer 11 from its holder 12.

More specifically, as best seen in FIG. 2, both the upper wall 18 and lower wall 19 of the repointer 11 are substantially wider, that is, in the direction between their respective side edges 38 and 39 than the width of the holder 12 in the direction between the respective side edges 40 and 41 of the forward end 16. As readily apparent from FIG. 3, both the upper wall 18 and lower wall 19 are of the same width and extend a uniform distance over each side of the side edges 40 and 41 to provide a protected space along the side edges 40 and 41 of the holder 12.

Stated differently, the upper and lower walls 18 and 19 forming the V-shaped opening for the tip 16 of the holder 12 have portions 44 and 45, FIG. 3, overhanging the respective side edges 40 and 41 of the holder 12 to form a protective cavity or recessed area for the reception of a pair of welds W between the repointer 11 and adapter 12. The welds W are formed in the protected cavities and at the rounded concave surface 30, FIG. 1, of the repointer 11 and the edge 25 of the holder 12 along the side edges 40 and 41 of the holder 12. The placement of the welds W at this foremost location on the holder 12 reduces the amount of leverage, that is, the distance through which bending forces may act on the weld. Also, the positioning of the weld in the cavity between the overhanging edges 44 and 45 of the upper and lower walls 18 and 19 of the repointer 11 protects the weld against being worn away as the tooth is being worn along its frontal edge 50 and side edges 38 and 39.

In addition to the welds W, there are preferably four additional small welds W1 between the repointer 11 and the holder 12 at rear walls 53 and 54, FIG. 1, of the top and bottom walls 18 and 19. When the repointer 11 is disposed on the holder 12, transversely extending grooves 56 or spaces in the holder 12 are aligned with the end or rear walls 53 and 54 of the repointer to define therebetween cavities 52 to receive the welds W1. It will be noted that the welds W1 are disposed in the cavities 52 so as not to be worn away, and to be within the profile of the outwardly flaring side walls 18 and 19 of the repointer 11 so as not to afford an obstruction or a non-streamlined surface detrimental to digging.

With the present invention it has been found possible to employ only six small welded areas rather than long continuous welds that have heretofore been proposed. Because of the ability to employ such a limited number of welds W and W1, considerable economies are realized both from the amount of time necessary to place new welds and to burn out old welds as well as the expense of the welding rod material employed for the long continuous type of welds.

The holder 12 can be any one of a variety of shapes, but is shown as having a V-shaped opening 60 with opposed inclined upper and lower walls 62 and 63 extending inwardly to meet at a rounded point 64. The groove 60 is adapted to receive a wedge-shaped projection that is an integral part of the bucket lip (not shown) and to be secured thereto by retainer means (not shown) adapted to be inserted in a key socket 65, FIG. 2, formed in each of the upper and lower walls 62 and 63 of the adapter 12. Manifestly, the projection on the lip (not shown) to be disposed in the space 60 of the adapter 12 has an opening therein which is aligned with the socket 65 in the walls 62 and 63 to receive such retainer means inserted through the holder 12 and the lip projection when the latter is neatly fitted into tight abutting relationship against the inclined walls 62 and 63 of the holder 12. Such a method of attachment is well known in the art and constitutes no part of the present invention. In fact, the general relationship is illustrated in FIG. 16 of Daniels Patent No. 2,369,285. The head of such a retaining means will be disposed in a shallow groove 70, FIG. 2, formed about the socket 65 in the upper wall 66 of the adapter 12.

As noted above, the adapter 12 is merely exemplary, and it may itself be separably secured to a primary adapter in turn separably secured to a dipper lip or other digging member. In this event, the assembly as a whole, including the primary adapter, becomes a substitute for so-called two-part replaceable teeth (of which examples are disclosed in Ratkowski Patents Nos. 2,904,908, 2,905,909, and 2,951,300) and the repointer 11 and its adapter or holder 12 becomes the replaceable point or tip, as a whole, separable from the primary adapter.

From the foregoing, it will be seen that the present invention is directed to a novel repointer having overhanging upper and lower walls 18 and 19 forming protected pockets at the side walls of the holder 12 so that the holder 12 and repointer 11 can be welded at these side walls of the holder and within a protected area afforded by the overhanging walls 18 and 19 of the repointer 11. Also, the present invention affords protection to a number of strategically placed small rearward welds which, together with the forward welds, provide small areas of non-continuous welds to secure the repointer to the adapter.

Hence, while I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A repointer assembly adapted to be secured to a support on a base of a dipper bucket or the like to provide a replaceable lip or tooth portion for said bucket, said assembly comprising a holder means adapted to be secured to a support to extend forwardly from the base of said bucket; a forward portion on said holder means being substantially wedge-shaped; a cast-to-shape repointer adapted to be secured to said holder means to constitute with said holder means the repointer assembly; a receiving means in said repointer adapted to receive said forward portion of said holder means; top and bottom walls on said repointer being of a greater width than the width of said forward portion of said holder means to present laterally open recess areas for receiving welds; said walls on said repointer also being substantially co-extensive with said forward portion and exposing space between said forward portion and said receiving means to afford a weld cavity to join said holder means and said repointer; a pair of spaced tongue means on said repointer disposed intermediate said top and bottom walls to keep said top and bottom walls from spreading, and groove means in said holder means to receive said spaced tongue means.

2. A repointer assembly adapted to be secured to a support on a base of a dipper bucket or the like to provide a replaceable lip or tooth portion for said bucket, said assembly comprising an adapter means for securing said assembly to a support to extend forwardly from the base of said bucket; a projection on said adapter means; a cast-to-shape repointer adapted to be secured to said adapter means to constitute with said adapter means the repointer assembly; said repointer having an upper and rearwardly extending wall and a lower and rearwardly extending wall, said upper and lower walls diverging from each other to form a substantially V-shaped cavity therebetween; said projection having a matching substantially V-shaped profile to be inserted in said V-shaped cavity, said projection being of a first width; said upper and lower walls being of a greater width than said projection and having overhanging portions on said upper and lower walls on opposite sides of said projection, said overhanging portions on each side of said projection providing a laterally open recessed area for receiving a weld to join said projection and said repointer.

References Cited by the Examiner

UNITED STATES PATENTS

| | | | |
|---|---|---|---|
| 2,369,285 | 5/1943 | Daniels et al. | 37—142 |
| 2,603,985 | 9/1949 | Vidmar | 76—101 |
| 2,874,491 | 12/1953 | Larson | 37—142 |

ABRAHAM G. STONE, *Primary Examiner.*

A. KOPECKI, *Assistant Examiner.*